July 23, 1935.  F. L. O. WADSWORTH  2,009,101
BRAKE
Filed Aug. 19, 1932
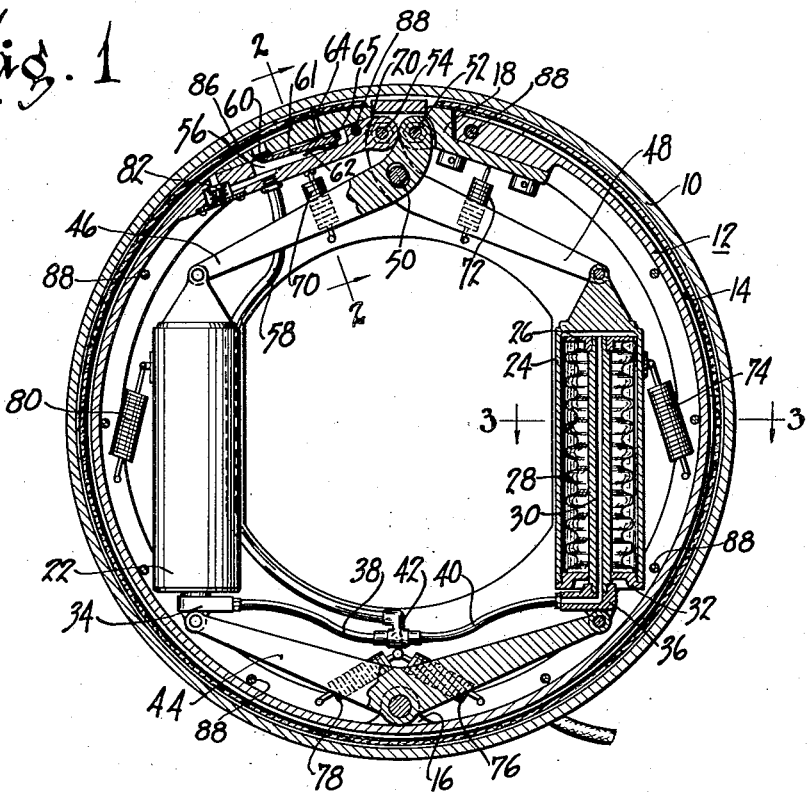
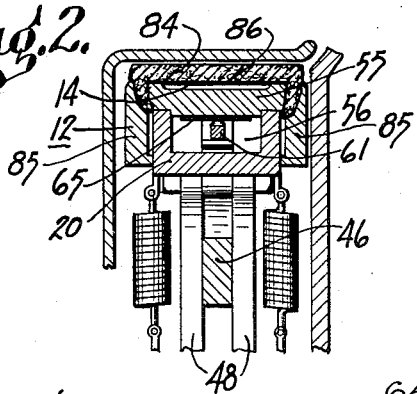
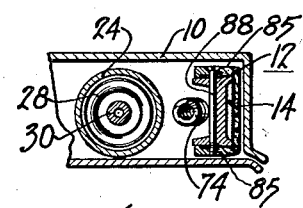
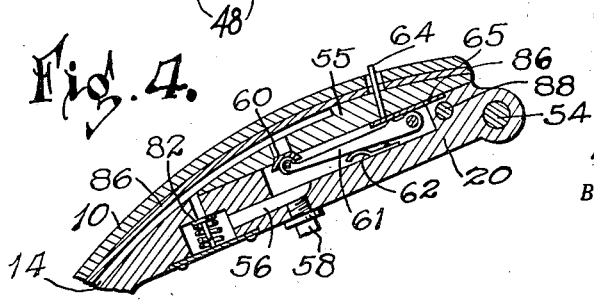
INVENTOR.
FRANK L. O. WADSWORTH
BY Jerome R. Cox
ATTORNEY.

Patented July 23, 1935

2,009,101

UNITED STATES PATENT OFFICE 2,009,101

BRAKE

Frank L. O. Wadsworth, Pittsburgh, Pa., assignor to Bendix Aviation Corporation, South Bend, Ind., a corporation of Delaware Application August 19, 1932, Serial No. 629,520

4 Claims. (Cl. 188—152)

This invention relates to brake apparatus and more especially to improved means acting through fluid connections for applying the friction element of a brake to its associated drum.

One of the objects of this invention is to provide fluid mechanism which operates through the initial stages of brake application at relatively low leverages and thus applies the shoes to the drums relatively quickly, and which acts through the final stages of brake application at relatively high leverages and thus enables the operator to utilize relatively low pedal pressures while forcing the shoes to contact with the drums at relatively high applying pressures.

A further object of the invention is the provision, in combination with one or more fluid cylinders for applying the friction element to the drum, of additional fluid means acting throughout the length of the friction element for forcing each separate section of the friction element into contact with the drum.

One of the features of my invention is the provision of a pair of cylinders which act through lever arms for forcing the friction element initially into contact with the drum.

A further feature of the invention is the provision of a valve actuated by the contact of the friction element with the drum to permit passage of fluid to a circular chamber extending all of the way around the friction element and adapted to allow the fluid to apply pressure to every portion of the friction element.

Further objects and features of the invention will be apparent after a reading of the subjoined specification and claims and after a consideration of the accompanying drawing in which:

Figure 1 is a view in vertical section of a brake drum provided with brake applying apparatus constructed according to my invention;

Figure 2 is a view in section on an enlarged scale taken substantially on the line 2—2 of Figure 1;

Figure 3 is a view in horizontal section taken substantially on the line 3—3 of Figure 1; and Figure 4 is a view in vertical section on an enlarged scale of a portion of the brake drum shown in Figure 1.

Referring in detail to the drawing, it may be seen that I have provided a brake drum 10 within which there is positioned a brake band 12, formed with a substantially coextensive fluid passageway or chamber 14. The band 12 is provided, at substantially its central point, with an ear 16 to which there may be attached one of the brake applying levers; and each end of the said band is also provided with terminal members, such as 18 and 20, to which may be secured other brake applying levers.

For initially expanding the band 12, I provide a pair of cylinders 22 and 24. Each of the cylinders 22 and 24 contains a head, such as the head 26, having secured thereto a flexible corrugated tube, such as the metal bellows 28, which is attached to the lower end 32 of the cylinder. Each cylinder is provided with an inlet tube 30 which is adapted to slide through the lower end 32 of the cylinder. The lower ends of the tubes 30 are secured to fittings 34 and 36 with which there are connected flexible fluid conduits 38 and 40. The opposite ends of the flexible conduits 38 and 40 are connected to an inlet fitting 42 through which fluid is supplied to the conduits and to the cylinders. The lower ends of the fittings 34 and 36 are formed with ears by which they are connected to the outer ends of a bar 44, which, at its central point, is pivotally attached to the ear 16. The upper ends of the cylinders 22 and 24 are pivotally attached to levers 46 and 48, which are coupled to each other by a pin and slot connection 50, and which, at their opposite ends, are pivotally attached, respectively, at 52 and 54, to the brake band terminals 18 and 20.

The end member 20 of the band 12 is provided with a recessed portion that is covered by the cap 55 to form a chamber 56, to which fluid is supplied from the inlet fitting 42 by a flexible cable 58. Positioned in the chamber 56 is a valve 60 normally maintained in closed position by a spring 62. The spring thus normally prevents passage of fluid from the chamber 56 to the passage-way 14. A pin 64 is adapted to contact with the drum and as the friction band 12 is moved outwardly toward the drum, this pin is moved inwardly relatively thereto and acts to open the valve 60 against the pressure of the spring 62 and allow the passage of fluid from the chamber 56 into the passage-way 14.

Springs such as 70, 72, 74, 76, 78, and 80 are adapted, upon the release of pressure to withdraw the band from contact with the drum and position the band in the central position. A light check valve 82 allows quick relief of liquid from the passageway 12 to the chamber 56 when the pressure is released.

In this form of construction the brake band is preferably made of T-shaped cross section as shown in Figure 2, and is provided with a thin flexible cover plate 86, which is not effected by the action of the liquid employed in the system, and which is preferably soldered, otherwise hermetically secured, to the outer edges of the brake band and its associated cap plate 55. The flexible brake lining 84 is also preferably provided with inwardly turned edge portions, and is clamped in position on the T-shaped brake ring 12 by mean of the rings 85—85 and the cross bolts 88.

It may be seen that I have provided a hydraulically operated continuous contact action brake in which the establishment of fluid pressure in the cylinders 22—24 first presses the median portion of the brake ring lining into contact with the drum and then spreads the ends of said ring by the action of the scissors linkage 46—48. The radial expansion of the band causes the pin 64 to open the valve 60 and admits pressure to the chamber or passage-way 12 thereby forcing all portions of the lining into continuous contact engagement with the brake drum. The opening of the valve 60 is preferably effected by the use of a pin which is made of brass or other metal that will be worn down at the same rate as the lining and which engages a metal diaphragm 65 on the inner face of the cap 55 and thus moves the lever 61 and the valve 60. When the pressure in the conduit is relieved the check valve 82 immediately opens and allows the brake lining to free itself from the drum before the brake ring itself is retracted by the return movement of the cylinder linkage under the pull of the springs 70, 72, 74, 76, 78, and 80.

It is to be understood, that the above described embodiments of my invention are for the purpose of illustration only and various changes may be made therein without departing from the spirit and scope of the invention.

I claim:

1. In a brake, a drum, a friction element, means for moving said friction element into contact with said drum, at a plurality of points, and separate means rendered operative by the movement of the friction element into contact with the drum, for moving said friction element into continuous contact with said drum.

2. In a brake, a drum, a friction element, means for moving said friction element into contact with said drum at a plurality of points, separate means for moving said friction element into continuous contact with said drum, and a valve controlled by the movement of the friction element into contact with the drum for rendering said last named means operative.

3. In a brake, a drum, a friction element, means for moving said friction element into contact with said drum at a plurality of points, separate means for moving said friction element into continuous contact with said drum, and means for quickly relieving the pressure of said last named means.

4. In a braking system, the combination of a brake drum, an expansible brake ring positioned therein, means for initially engaging said ring with said drum at a point intermediate the ends of the ring, other means for next engaging said ring with said drum at a plurality of other points, and additional means for applying a continuous pressure to all portions of the said ring.

FRANK L. O. WADSWORTH.